(12) United States Patent
Rasmussen et al.

(10) Patent No.: US 7,225,327 B1
(45) Date of Patent: May 29, 2007

(54) METHOD, SYSTEM, SOFTWARE, AND PROCESSOR FOR INITIALIZING INFORMATION SYSTEMS OPERATING IN HEADLESS AND NON-HEADLESS ENVIRONMENTS

(75) Inventors: Karl Rasmussen, Temple, TX (US); Yifei Wan, Round Rock, TX (US)

(73) Assignee: Newisys, Inc., Austin, TX (US)

( * ) Notice: Subject to any disclaimer, the term of this patent is extended or adjusted under 35 U.S.C. 154(b) by 457 days.

(21) Appl. No.: 10/417,248

(22) Filed: Apr. 11, 2003

(51) Int. Cl.
*G06F 9/24* (2006.01)
*G06F 15/177* (2006.01)

(52) U.S. Cl. .............................. 713/2; 713/1
(58) Field of Classification Search ...................... None
See application file for complete search history.

(56) References Cited

U.S. PATENT DOCUMENTS 5,463,766 A * 10/1995 Schieve et al. ............... 714/36
6,249,812 B1 * 6/2001 Cromer et al. .............. 709/221
6,732,267 B1 * 5/2004 Wu et al. .................... 713/100
6,957,252 B1 * 10/2005 Bui et al. .................... 709/220
7,036,040 B2 * 4/2006 Nicholson et al. ............. 714/6

* cited by examiner

Primary Examiner—A. Elamin
Assistant Examiner—Anand B. Patel
(74) Attorney, Agent, or Firm—Raymond M. Galasso; Galasso & Associates, LP

(57) ABSTRACT

A method, system, software, and processor for initializing information systems operating in headless and non-headless environments are presented. In one form, an information system includes a server platform operably associated with a platform BIOS and a service processor communicatively coupled to the platform BIOS. The service processor employs a platform boot monitor operable to provide an initialization mode of the server platform and may provide a flash update mode for updating a system BIOS.

18 Claims, 7 Drawing Sheets

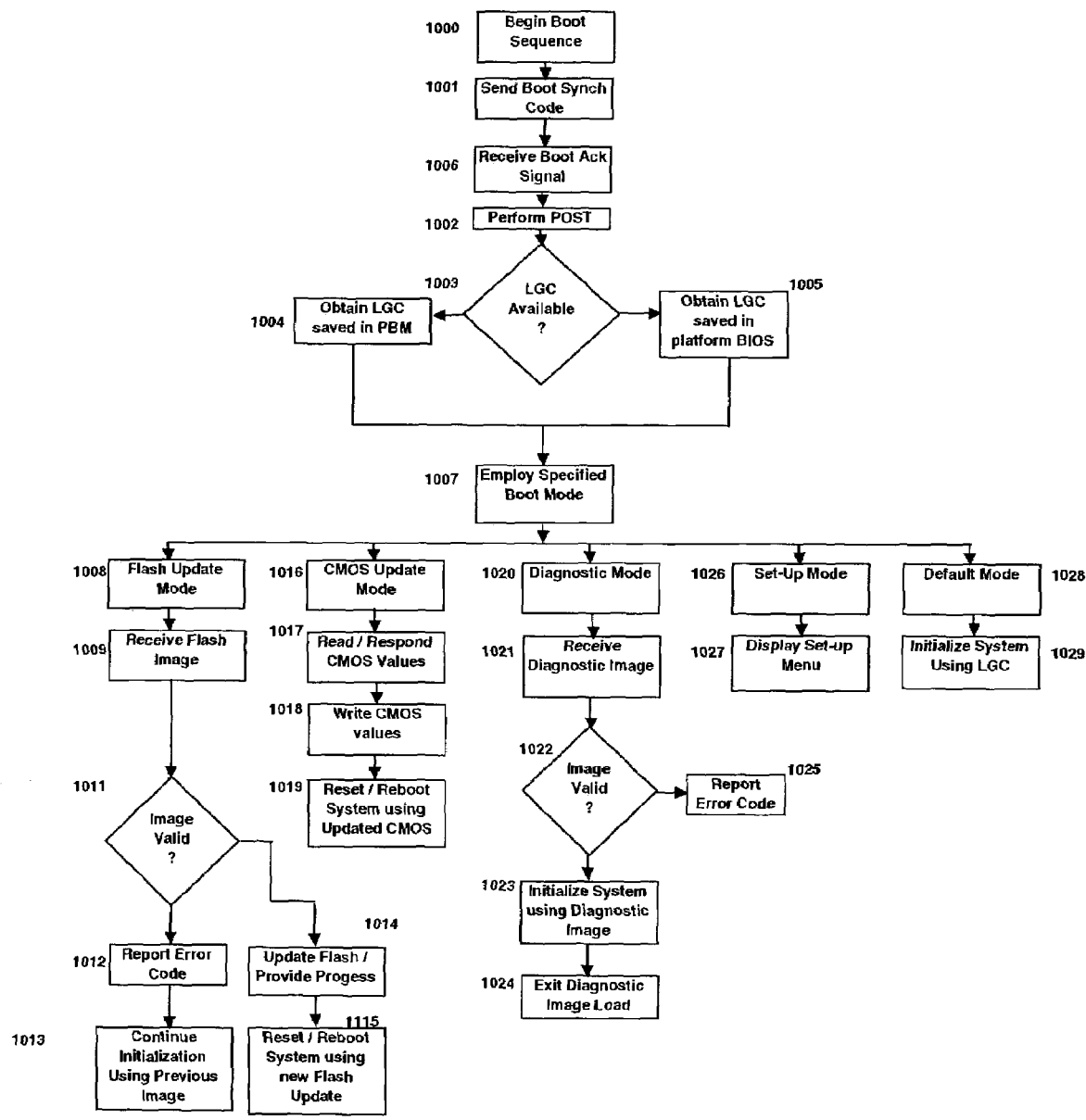

METHOD, SYSTEM, SOFTWARE, AND PROCESSOR FOR INITIALIZING INFORMATION SYSTEMS OPERATING IN HEADLESS AND NON-HEADLESS ENVIRONMENTS

FIELD OF THE DISCLOSURE

The present invention relates generally to computer system initialization routines, and more particularly to maintaining and updating BIOSs and initialization modes within headless and non-headless computer systems and servers.

BACKGROUND

Most conventional computer systems include boot sequence setting that control the order a BIOS uses to look for boot devices from which to load an operating system. Some conventional systems include accessing storage media to obtain an operating system to load during system initialization. For example, DOS looks to a floppy or hard disk drive to load a system's operating system.

Advanced systems allow other types of boot sequence options such as allowing a system to boot off a different hard disk drive (i.e. an 'E:' drive) other than the primary disk drive (i.e. 'C:'drive). One advantage of providing an alternate boot drive is reducing the risk of a boot sector virus spreading from one disk drive to another. However, some disadvantages arise from using customizable initialization sequences and/or booting from various disk drives. For example, if a virus is discovered on a system, a clean floppy disk must be used to boot the system. If a system is set-up to boot from the infected disk drive, a user must manually alter the boot sequence in an effort to disinfect and restore the disk drive for subsequent use.

Peripheral devices and/or hardware dependencies of boot sequences can also leave a system vulnerable to unrecoverable system initialization errors. For example, hardware failure of a floppy disk drive, hard disk drive or boot ROM device may prove fatal and render a system inoperable due to not being able to access or load an operating system during initialization.

Therefore, what is needed is an initialization system and method that lacks dependency on peripheral devices, user interaction, and fixed hardware to initialize processors, computer systems and servers.

BRIEF DESCRIPTION OF THE DRAWINGS

Other advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 10 is a flow diagram illustrating a method for initializing a server platform using a multi-mode initialization sequence according to at least one embodiment of the present invention.

DETAILED DESCRIPTION OF THE FIGURES

Figure 1A:
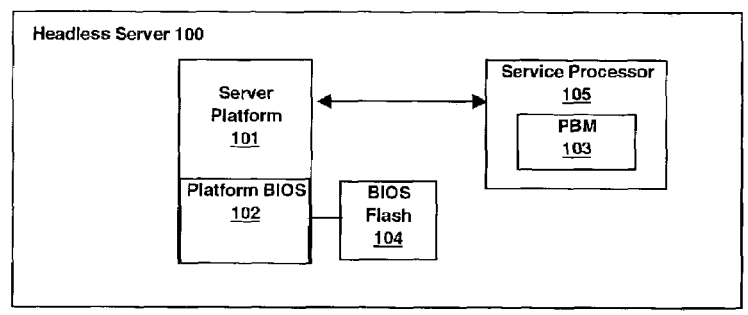
FIG. 1A is a general block diagram illustrating a server platform configured as a headless server according to at least one embodiment of the present invention.

FIGS. 1–10 illustrate systems and methods for maintaining and updating platform BIOSs and initialization sequences in headless and non-headless operating environments as described in further detail in the text which follows. A headless operating environment includes a system that lacks one or more conventional user interface devices (i.e. keyboards, displays, pointing devices, etc.) and/or peripheral components (i.e. Floppy Disk Drives, etc.) that allow users to modify initialization sequences. A headless system configuration of the disclosure includes providing computer systems and servers with only core components such as a processor and memory operably coupled to, and in communication with, a Service Processor (SP) operable to maintain, update, and provide initialization sequences.

The following definitions are not intended to be limiting, but are provided to aid the reader in properly interpreting the detailed description of the present invention. It will be appreciated that the terms defined herein may be eventually interpreted by a judge or jury, and that the exact meaning of the defined terms will evolve over time. The word "module" as used herein refers to any piece of code that provides some diagnostic functionality. Some examples of modules as used herein include device drivers, command interfaces, executives, and other applications. The phrase "device drivers," as used herein and sometimes referred to as service modules, refers to images that provide service to other modules in memory. A driver can "expose a public interface," that is, make available languages and/or codes that applications use to communicate with each other and with hardware. Examples of exposed interfaces include an ASPI (application specific program interface), a private interface, e.g., a vendor's flash utility, or a test module protocol for the diagnostic platform to utilize. The word "platform" as used herein generally refers to the server functionality provided by the underlying hardware. Such functionality may be provided using single integrated circuits, for example, various information processing units such as central processing units used in various information handling systems. Alternatively, a platform may refer to a collection of integrated circuits on a printed circuit board, a stand-alone information handling system, or other similar devices providing the necessary functionality. The term platform also describes the type of hardware standard around which a computer system is developed. In its broadest sense, the term platform encompasses processors, service processors, and other integrated circuits that provide initialization, diagnostic, and server functionality. The word "server" as used herein refers to the entire product embodied by the present disclosure, typically a service processor (SP) and one or more processors. In an embodiment, the one or more processors are AMD K8/Opteron processors, or other processors with performance characteristics meeting or exceeding that of AMD K8/Opteron processors.

FIG. 1A is a block diagram illustrating a server platform configured as a headless data processing system or server according to one embodiment of the present invention. A headless data processing system as referred to herein is a data processing system that omits conventional means (e.g., a monitor and keyboard) for enabling input of alphanumeric information into the data processing system. A headless server is an example of a headless data processing system. Due to the lack of the lack of conventional means for enabling input of alphanumeric information, usual methods of specifying configuration parameters for initialization or boot sequences (e.g., via a monitor and keyboard) cannot be used.

Headless data processing systems are typically rack mounted. In such a rack-mounted arrangement, only a relatively narrow face of headless data processing system is accessible from an access opening of the rack, limiting available space for a visual display and for input buttons. Accordingly, limited available space contributes to the desire and/or need for omitting conventional means for enabling input of required information (e.g., alphanumeric information, commands, etc) in a headless data processing system.

Protocols, in general, are messages communicated between interfaces and components by a mechanism called "messaging," which will also be covered in detail in subsequent paragraphs. The messaging mechanism is a communication protocol. Many of the protocols disclosed herein are interface protocols. The operation of protocols may be understood as analogous to an Internet web browser. A user sends a request to a web site over TCP/IP, and results are returned. The request and results are data that the TCP/IP protocols carry, without concern for what the data is. The TCP/IP protocol is an example of a messaging protocol. The messaging interface enables various requests and responses back and forth between modules without knowing, or caring, about the information. The particular initialization interface protocols discussed below specify messages that may be communicated at various levels of resource consumption during operation.

Figure 1B:
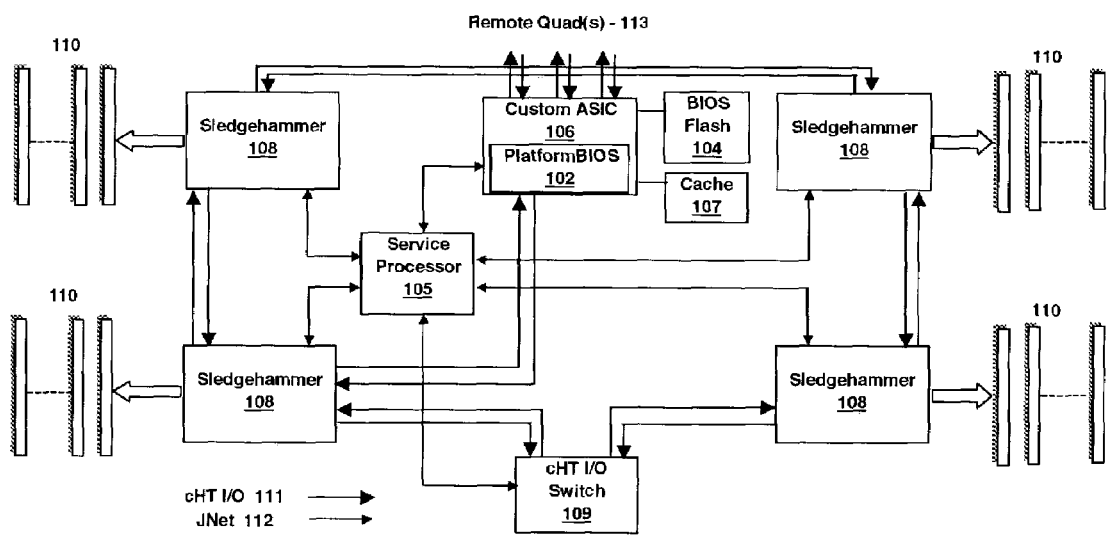
FIG. 1B is a detailed block diagram illustrating a server platform configured as a headless server according to at least one embodiment of the present invention.

A block diagram illustrating the basic server hardware architecture according to an embodiment of the present disclosure is illustrated in FIG. 1B. Recall that "server" as used herein generally refers to a complete, functional product embodied by the present disclosure, typically a service processor (SP) and one or more other processors, and are operably coupled to and/or associated with server platforms.

FIG. 1A depicts a headless data processing system or server 100 and includes a server platform 101 including several components as described below in addition to a platform BIOS 102 coupled to a BIOS flash 104 and operable to provide a BIOS during an initialization sequence of server platform 101. Headless server 100 further includes a service processor 105 having a platform boot monitor (PBM) 103 employed by service processor 105 during an initialization sequence or boot of server platform 101. Platform BIOS 102 and/or PBM 103 may be realized as software routines or encoded logic operable to be deployed by headless server 100 during initialization sequences. Although illustrated as an integral part of each server platform 101 and service processor 105, it should be understood that other embodiments for deploying a platform BIOS and/or platform boot monitor may be used without direct integration with each component as illustrated.

Data processor instructions are accessible by server platform 101 via memory (not expressly shown) and are processed by the server platform 101. Data processor instructions are adapted for enabling the server platform 101 to facilitate implementing query-response functionality in accordance with embodiments of the disclosures made herein.

FIG. 1B is a detailed illustration of headless server 100 of FIG. 1A and includes an OS independent, custom ASIC (application specific integrated circuit) that allows scalable expansion up to 16-way within the SMP (symmetric multiprocessor) programming model, as indicated by the coherent HyperTransport (cHT) signal lines 111 to/from remote quads 902. The custom ASIC 106 has an attached cache 107 for performance. The hardware as illustrated also contains four AMD K8 "Sledgehammer" or "Opteron" processors 108, with a coherent HyperTransport (cHT) input/output (I/O) switch 109, as HyperTransport data interconnection technology is utilized within one embodiment of the system. Coherent HyperTransport is a proprietary implementation of HyperTransport technology developed by Advanced Micro Devices (AMD), with added coherency features to properly enable connection between processors. Thus 16-bit cHT signal lines 111 permit chip-to-chip data exchange between Sledgehammers 108 and custom ASIC 106, as well as to remote quads 113. Banks of DDR (double data rate) memory 110 provide distributed shared-memory for the SMP arrangement. DDR 110 can be a dual channel DDR or another DDR arrangement. Communication between the service processor 105 and the other components (i.e., 106, 109, 108) are handled by hardware control logic (JNet 112) that provides an interface that utilizes dual access memory.

The method, systems and server architecture disclosed herein are capable of integration with third party management frameworks, for example, SNMP (simple network management protocol) and CIM (common information model), and are modularly scalable, i.e., offer a "one to many" management capability. In addition to 32-bit computational ability, the server architecture disclosed herein is capable of 64-bit computational ability as well. This 64-bit computing ability is backward compatible with 32-bit applications, yet offers the advantage of maximum 64-bit computational density. The server architecture as disclosed herein has the ability to run 32-bit and 64-bit applications in the same system, thus offering the advantage of a non-disruptive migration to 64-bit computing. A 64-bit computing capability permits larger addressable memory and computational power, which results in improved performance for OLAP, OLTP, and DB workloads.

The servers, systems and server platforms as embodied by the present invention can deliver Enterprise-level system management and reliability, availability, and security (RAS) features to meet the load requirements imposed by the growing demands on servers in today's information-hungry markets. The modular scalability of the system means that processing power can be adapted to workloads ranging from a basic SP/platform for the entry-level buyer, up to high-end SMP servers for Fortune 500 data center environments and/or enterprise resource planning (ERP) systems.

During use, system 100 advantageously allows for a device, platform, and user independent initialization sequences through providing a platform BIOS operably coupled to a service processor that provides initialization information for initializing server platform 101. BIOSs are generally used to initialize a system and include parameters and settings that may be specific to a system or server. BIOSs may be stored within flash memory 104 of server 100 and may be updated without replacing or accessing hardware components or providing additional boot disks (i.e. floppy disks, hard disk drives, etc.). Platform BIOS 102 is the first code to execute on server platform 101 from power-up, reboot or reset conditions. An initial platform configuration and verification (i.e. Power On Self Tests, POSTs) are performed after which a server platform operating system is loaded. Service processor 105 provides software components, such as a platform boot monitor, to facilitate initializing server platform 101 in various boot modes.

During initialization, server 100 engages platform boot monitor (PBM) 103 and determines an initialization mode for server 100. PBM 103 enables high level management of initialization parameters, values and sequences through providing initialization codes to platform BIOS 102 during initialization periods. Platform BIOS 103 is receptive to inputs and messages provided by PBM 103 and enables specified initialization or boot modes for server 100. PBM 103 may be realized as encoded logic, a software module, or other type of agent operable to provide programmatic functionality and initialization codes for initializing server 100. For example, PBM 103 may be employed by a service processor operably associated with server 100 and configured to employ a program of instructions to provide PBM 103.

PBM 103 may also access a modifiable initialization source such as a file or programmable logic operable to provide preferred initialization information. Based on the desired initialization, PBM 103 provides an initialization code identifying a desired initialization mode of server 100. Some initialization modes, such as updating a flash BIOS and updating CMOS values may be desired. Enhanced functionality for initializing server 100 may also be provided by including initialization codes for deploying a diagnostic or set-up mode of server 100. Other initialization modes may also be considered as enhanced features and functionality of servers and associated systems and platforms proliferate.

In one embodiment, access to information for determining initialization modes may be provided through remote access terminal obviating the need for proximal or localized management of servers and initialization sequences. For example, in a headless system, user interfaces and input devices may not be desired given the nature of some rack mounted systems. As such, a user may configure an initialization sequence for one or more server or server platforms, through remotely accessing and modifying information provided during initialization avoiding the need to be proximally located to access hardware internal or external to a server or system.

Figure 2:
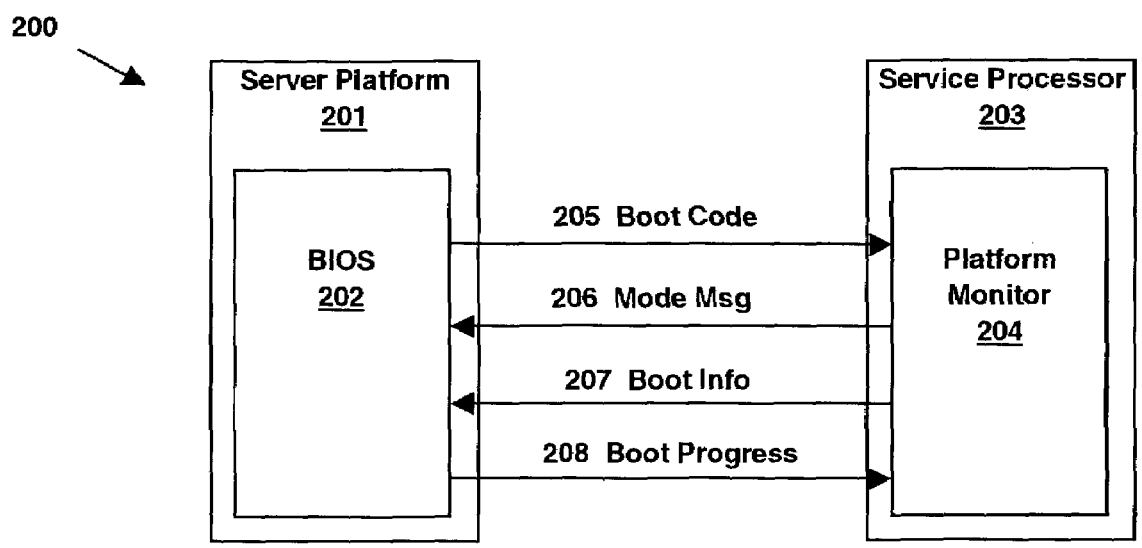
FIG. 2 is a block diagram illustrating a platform BIOS interfacing a Platform Boot Monitor (PBM) to facilitate initializing a server platform according to at least one embodiment of the present invention.

FIG. 2 is a block diagram illustrating a platform BIOS interfacing a Platform Boot Monitor (PBM) to facilitate initializing a server platform according to one embodiment of the present invention. Server platform 201 includes a platform BIOS 202 operably coupled to a service processor 203 having a platform boot monitor (PBM) 204. Server platform 201 also includes additional hardware and software to assist with normal operation and processing of information in a server environment.

During operation, platform BIOS 202 communicates a boot code 205, boot synch, to PBM 204 to inform PBM that an initialization routine is occurring. Boot code 205 provides a BIOS initialization status during initialization and PBM 204 determines a boot mode in response to receiving the status. For example, PBM 204 may determine that a flash update is available, a diagnostic mode is requested, a CMOS update is requested, or a normal boot routine should be deployed. Upon determining a boot mode, PBM 204 communicates a mode message 206 to platform BIOS 202 indicating the boot mode for server platform 201. Boot information 207 may be provided as a part of, or separate from, mode message 206 and includes a boot code to indicate the desired boot mode of server platform 201. Platform BIOS 202 uses boot information 207 to initialize server platform 201 and provides a boot progress 208 to PBM 204 to indicate the initialization status of server platform 201. Through platform BIOS 202 engaging service processor 203, external control for initializing server 100 may be realized thereby reducing server platform dependency for initializing server platforms.

Figure 3:
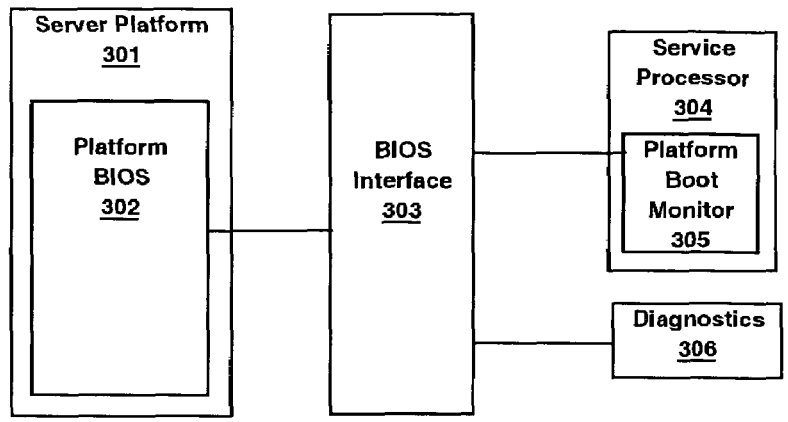
FIG. 3 is a block diagram illustrating a BIOS interface to facilitate a multi-mode initialization sequence of a server platform according to at least one embodiment of the present invention.

FIG. 3 is a block diagram illustrating a BIOS interface to facilitate a multi-mode initialization sequence of a server platform according to one embodiment of the present invention. Server platform 301 includes a platform BIOS 302 coupled to a BIOS interface 303 to assist with coupling several software components that may be accessed during initialization of server platform 301. For example, BIOS interface 303 provides for access to a platform boot monitor 305 employed by a service processor 304, access to a diagnostics module 306 allowing for entry of a diagnostic mode of operation during an initialization sequence. Other interfaces may also be provided as needed.

During initialization, platform boot monitor (PBM) 305 is coupled to platform server 301 via BIOS interface 303 and provides a communication interface for platform BIOS 302 to assist with initializing platform server 301. BIOS interface 303 is configured for multiple types and levels of communication depending on the state of the initialization and available resources. For example, during early stages of initialization, resources such as memory may be limited and as such BIOS interface 303 may provide for a reduced communication protocols such as a connectionless interface or a low level resource consuming protocol such as a BIOS simple protocol. As an initialization sequence progresses, increased levels of communication or enriched communication protocols such as UDP/IP may be used by BIOS interface 303 to allow for more robust communication between server platform 301 and service processor 304. In one embodiment, Jnet communication may be used to implement one or more interface of BIOS interface 303. For example, JNet includes a dual I/O interface to a memory buffer. One of the interfaces is used by server platform 301 to read and write and the other interface is used by service processor 304.

In an exemplary embodiment, PBM 305 communicates with BIOS interface 303 to provide a BIOS initialization code indicating a boot mode for server platform 301. For example, PBM 305 may determine that a diagnostic mode of operation is desired and may provide an input to BIOS 302 via BIOS interface 303 indicating a diagnostic boot mode. Additionally, BIOS interface 303 may provide an interface to diagnostic module 306 to initialize server platform 301 in a diagnostic mode. In one embodiment, a diagnostic image may be communicated via BIOS interface 303 to server platform 301. Upon receipt of the image, the image may be deployed by server platform 302 enabling access to diagnostic module 306. As such, BIOS interface 303 may assist with providing interfaces between modules and other components as needed during an initialization sequence to enable communication during a desired initialization sequence and/or boot mode.

Figure 4:
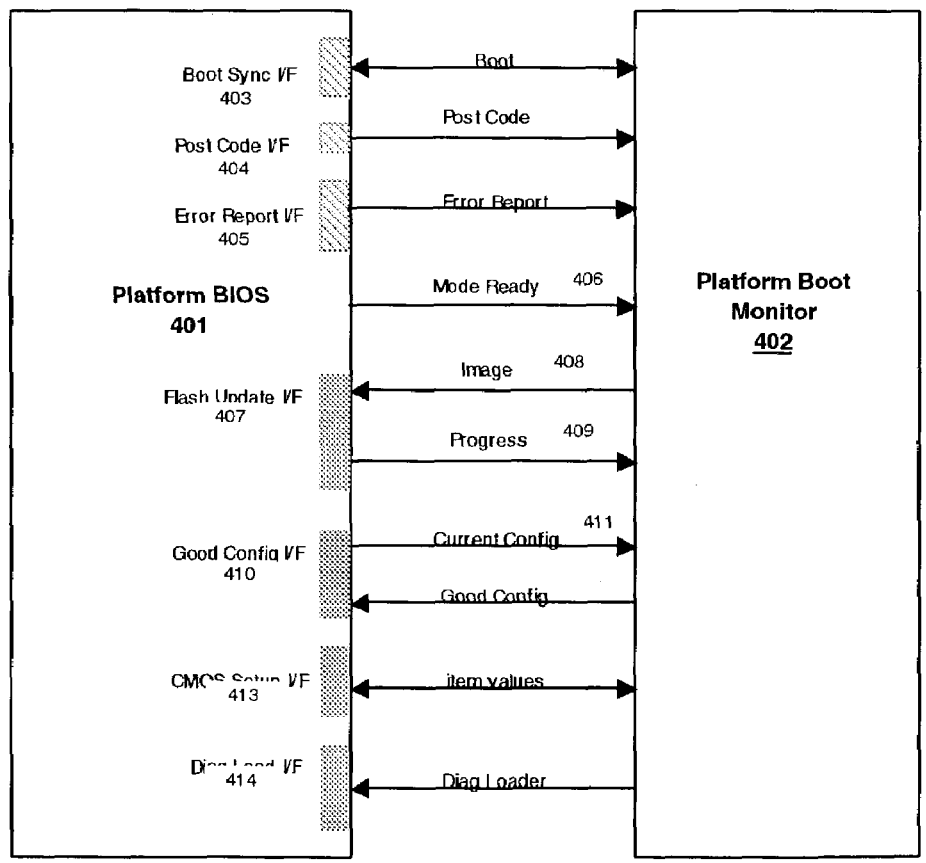
FIG. 4 is a block diagram illustrating platform BIOS interface coupled to Platform Boot Monitor (PBM) of a service processor according to at least one embodiment of the present invention.

FIG. 4 is a block diagram illustrating a platform BIOS incorporating a BIOS interface coupled to a Platform Boot Monitor (PBM) according to one embodiment of the present invention. Platform BIOS 401 includes several interfaces for coupling platform BIOS 401 to platform boot monitor (PBM) 402. Platform BIOS 401 includes a boot synch interface 403, a post code interface 404, and an error report interface 405 with each interface employing a BIOS simple protocol operable to communicate with PBM 402 incorporated as a part of a service processor (not expressly shown). A BIOS simple protocol is a reduced resource protocol that does not require memory intensive overhead for the manipulation of messages during an exchange of information. Platform BIOS 401 also includes a mode ready connection 406 that allows messages to be communicated from platform BIOS 401 to PBM 402 to indicate that platform BIOS 401 is available to begin and/or terminate initialization. For example, a dialog provided via boot synch 403 may be received by platform BIOS 401 and upon initiating start of a boot mode, a signal may be provided by mode ready message interface 406 to PBM 402 to indicate that the initiation has begun. Mode ready message interface 406 is a connectionless (i.e. non-threaded) interface and provides a BIOS complete message during communication with PBM 402 to indicate that platform BIOS 401 is initializing or complete and will not communicate further with PBM 402 until the next reboot or initialization. Post code interface 404 issues post code messages that are sent repeatedly as success indicators to PBM 402 to indicate that platform BIOS 401 is initializing server successfully.

Error report interface 405 provides messages including warnings and informative messages generated due to a power on self test (POST) error. An error code typically is a number that correlates to an error message used to describe a type of POST failure that occurred during an initialization. An error code of zero is provided for errors that occur early in an initialization sequence before memory is initialized. In one embodiment, PBM 402 may receive an error report prior to receiving a boot synch dialog. As such, mode ready message interface 406 may assume a closure status to inform PBM 402 that an error has occurred during the initialization sequence.

Platform BIOS 401 also includes a flash update interface 401 for providing an image message 408 and a progress message 409, a good configuration interface 410 for providing current configuration request message 411 and a good configuration message 412, a CMOS setup interface 413 for reading and writing CMOS values, and a diagnostic load interface 414. Each interface 407, 410, 413, and 414 are configured to communicate with PBM 402 using UDP/IP protocols and algorithms.

PBM 402 also stores a configuration table describing the last good configuration used to properly control the server platform configuration and provides a proper (or best guess) configuration. For example, platform BIOS 401 receives the last good configuration table from PBM 402. This allows for the last hardware configuration of the platform to be saved and updated. An additional copy of the configuration file may be stored by the server platform and accessible by platform BIOS 401 allowing for a saved copy to be accessed if PBM 402 does not provide a last good configuration table. Platform BIOS 401 also detects any changes to the current hardware configuration and provides configuration changes to PBM 402 to ensure PBM 402 maintains a current configuration.

Figure 5:
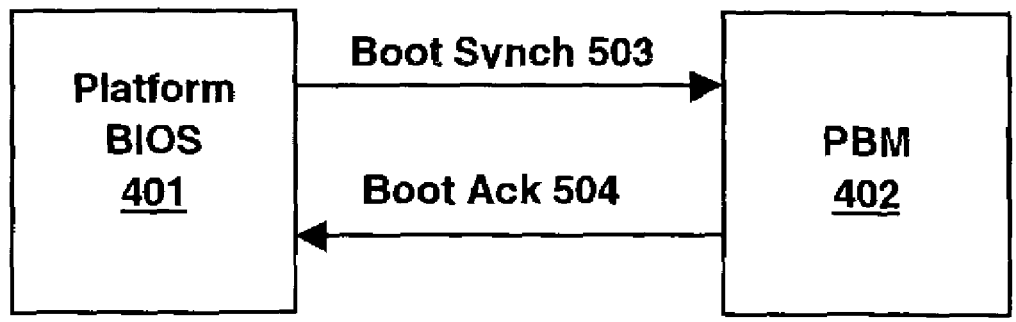
FIG. 5 is a block diagram illustrating a boot synch dialog employed during an initialization sequence of a server platform according to at least one embodiment of the present invention.

During use, platform BIOS 401 interfaces PBM 402 via JNET employing both UDP/IP protocol and a BIOS simple protocol over JNET communication hardware of server platform 301. Each interface may be realized as a functional interface including software and associated hardware for communicating with PBM 402 employed by a service processor (not expressly shown). Each communication may also be viewed as a message or dialog. FIG. 5 is a block diagram illustrating a boot synch dialog employed during an initialization sequence of platform BIOS 401 according to one embodiment of the invention. Boot synch interface 403 provides an announcement message, boot synch 503, to PBM 402 to indicate that a boot process is initialized and PBM 402 should be prepared to respond to the boot process. PBM 402 provides an acknowledgement message, boot ack 504, to platform BIOS 401, indicating that PBM 402 is ready to proceed with a boot process.

If the dialog fails due to a time out, platform BIOS 401 will boot the server platform without interaction with PBM 402. Boot synch message 503 and boot ack message 504 advantageously allow for a reduced interface dialog to engage PBM 402 through use of a BIOS simple protocol. Additionally, boot ack message 504 may further include other boot mode information to facilitate initializing the server platform. For example, boot ack message 504 may include information for booting in a flash update mode, a CMOS update mode, and/or diagnostic mode. A set-up mode of operation may also be provided as a part of the boot ack 504 allowing for a platform BIOS set-up screen to be displayed or provided within a graphical user interface associated with the server platform.

Figure 6:
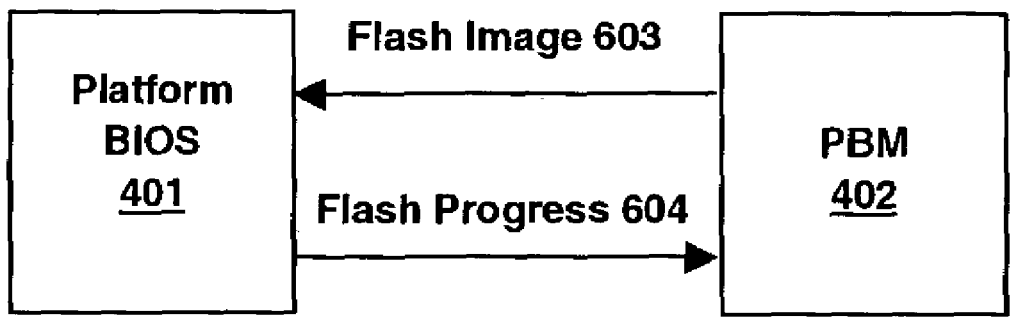
FIG. 6 is a block diagram illustrating a flash update dialog employed during an initialization sequence of a server platform according to at least one embodiment of the present invention.
Figure 7:
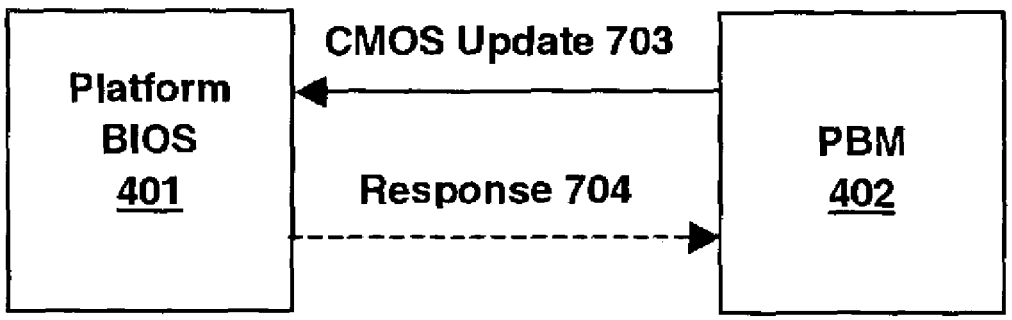
FIG. 7 is a block diagram illustrating a CMOS update dialog employed during an initialization sequence of a server platform according to at least one embodiment of the present invention.

FIG. 6 is a block diagram illustrating a flash update dialog provided during an initialization sequence of a server platform. PBM 402 determines if a BIOS flash update is available and initiates a flash update during a current initialization routine. One example of a flash update includes erasing a flash device and rewriting new content to the device. A flash image is used to provide the new content as a sequence of binary byte values for each byte of the flash device from beginning to end, with the addition of a checksum byte at the end that is used by platform BIOS 401 to validate the image is written to the flash device. For example, during the flash update, a flash image is communicated to platform BIOS 401 via flash update interface 407 and stored within RAM operably associated with BIOS 401 until the flash image is successfully received. Upon receiving the flash image, the new image is programmed into the BIOS flash of the server platform and a flash progress message 604 is communicated to PBM 402 until the update is complete. Upon completing the flash update, PBM receives an update complete message from platform BIOS 401 indicating completion and the service processor associated with PBM 402 reboots or reinitializes the platform server and uses the updated BIOS flash to initialize the server platform. In this manner, PBM 402 may maintain and communicate updated BIOS flash information for a server platform and dynamically provide flash updates without user interaction, replacing hardware components, or returning a server for servicing.

In one embodiment, a flash update image may be too large to communicate via a BIOS interface. As such, PBM 402 may divide the flash image as needed to limit datagram size to below a fragmentation limit thereby reducing sizing and communication errors that may occur during a flash update. For example, PBM 402 may divide the image into several parts and provide ID and length values with the first datagram to indicate that the image has been divided thereby allowing for large updates to be provided.

PBM 402 is allowed access to item descriptions generated as a part of a BIOS build process (i.e. Setup Nodes) allowing PBM 402 to work with a static, version specific CMOS map, which is produced during the platform BIOS build process when placed in a CMOS update mode. CMOS interface 413 also supports a "save-restore" function obviating the need for map values and a done message is sent via response 704 to PBM 402 to indicate that CMOS updating is complete and the platform server is reset or reinitialized using the new CMOS update. CMOS dialog also provides a method for controlling boot device selection related to partitioning, such as removing network of SCSI interface boot devices.

PBM 402 may also request or read CMOS values from, for example, 1 to 128 bytes in a similar manner as a write message. The request is provided to the BIOS to read the CMOS values and the BIOS returns the requested values and waits for the next CMOS message to execute (i.e. Read, Write, Done). The CMOS data values may then be stored within a network storage device to provide a backup of the CMOS values if needed. For example, CMOS interface 413 may employ a "save-restore" function, that includes access the backed up CMOS data in case of loss due to an extended power loss or other data-lossing event. As such, a file stored within a storage medium may be accessed to obtain CMOS values to restore the CMOS data used during initialization. In one embodiment, there may be some items, such as real time clock (RTC) registers and checksum bytes, that should not be rewritten from a backup and should either remain at a current value or may be regenerated.

Figure 8A:
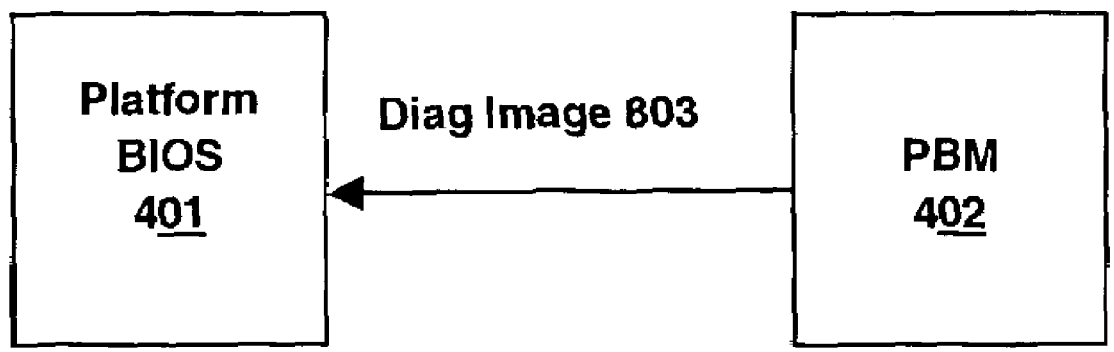
FIG. 8A is a block diagram illustrating a diagnostic load dialog employed during an initialization sequence of a server platform according to at least one embodiment of the present invention.

FIG. 8A is a block diagram illustrating a diagnostic load dialog employed during an initialization sequence of a server platform. Platform BIOS 401 provides for transfer of control to a diagnostic module after loading and provides an interface to the diagnostic module to read and save configuration data. Platform BIOS 401 interfaces PBM 402 via diagnostic load interface 414 to receive a diagnostic software code image that is loaded using a diagnostic software loader employed by platform BIOS 401 if a diagnostic mode of operation is selected. A diagnostic image is provided and may be divided as needed to limit datagram size to below fragmentation limit for communicating the image. In one embodiment, the diagnostic code image may be packaged as a bzImage Linux kernel using a large kernel load protocol (i.e. most of the image and protected sectors may be loaded above 1 MByte). During communication of the image, PBM 402 may pass command line arguments for the diagnostic code to the image kernel and Platform BIOS 401 loads the arguments allowing for interaction with the diagnostic module via Platform BIOS 401 and PBM 402 during execution of the diagnostic code (not expressly shown).

Figure 8B:
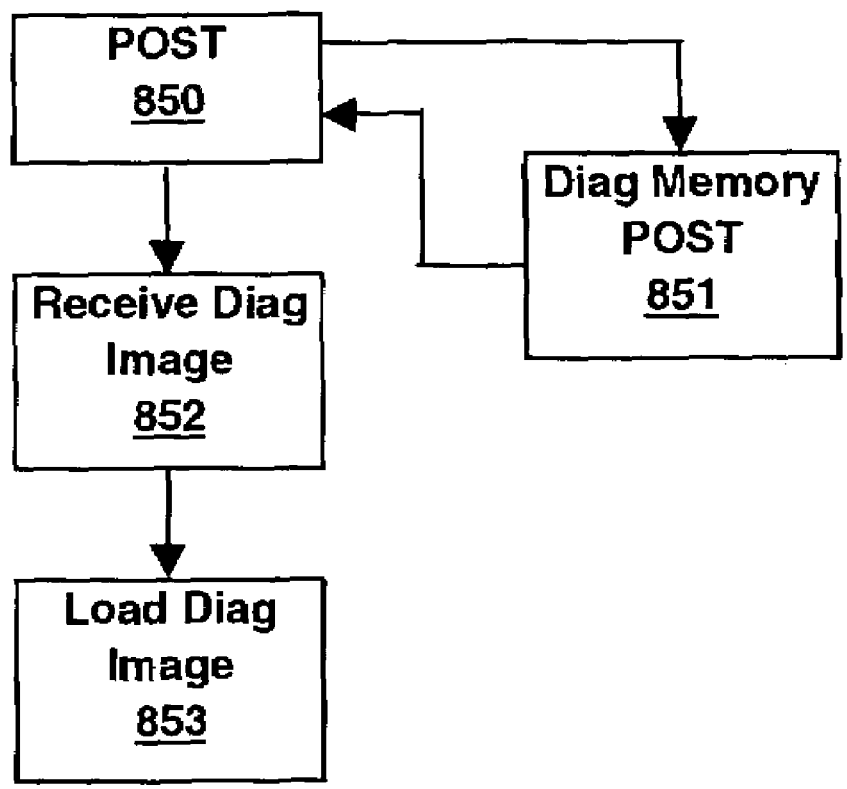
FIG. 8B is a flow diagram illustrating a method for initiating a diagnostic initialization mode according to at least one embodiment of the present invention.

FIG. 8B is a flow diagram illustrating a method for initiating a diagnostic initialization mode. Platform BIOS 401 employs the flow diagram illustrated to boot to the diagnostic mode of operation. For example, prior to platform BIOS 401 receiving a diagnostic load image, the platform BIOS may modify the POST sequence during a diagnostic boot mode to provide a more extensive memory test. For example, the method may begin with a modified POST 850 that includes performing a diagnostic memory POST 851. Upon validating the POST, the method proceeds to step 852 and the diagnostic image is received by platform BIOS 401 and to step 853 where the diagnostic image is loaded as described above. In this manner, an alternate POST sequence may employed during an initialization sequence allowing for mode specific tests, such as a diagnostic memory POST, to be performed based on the selected BIOS boot mode.

Figure 9:
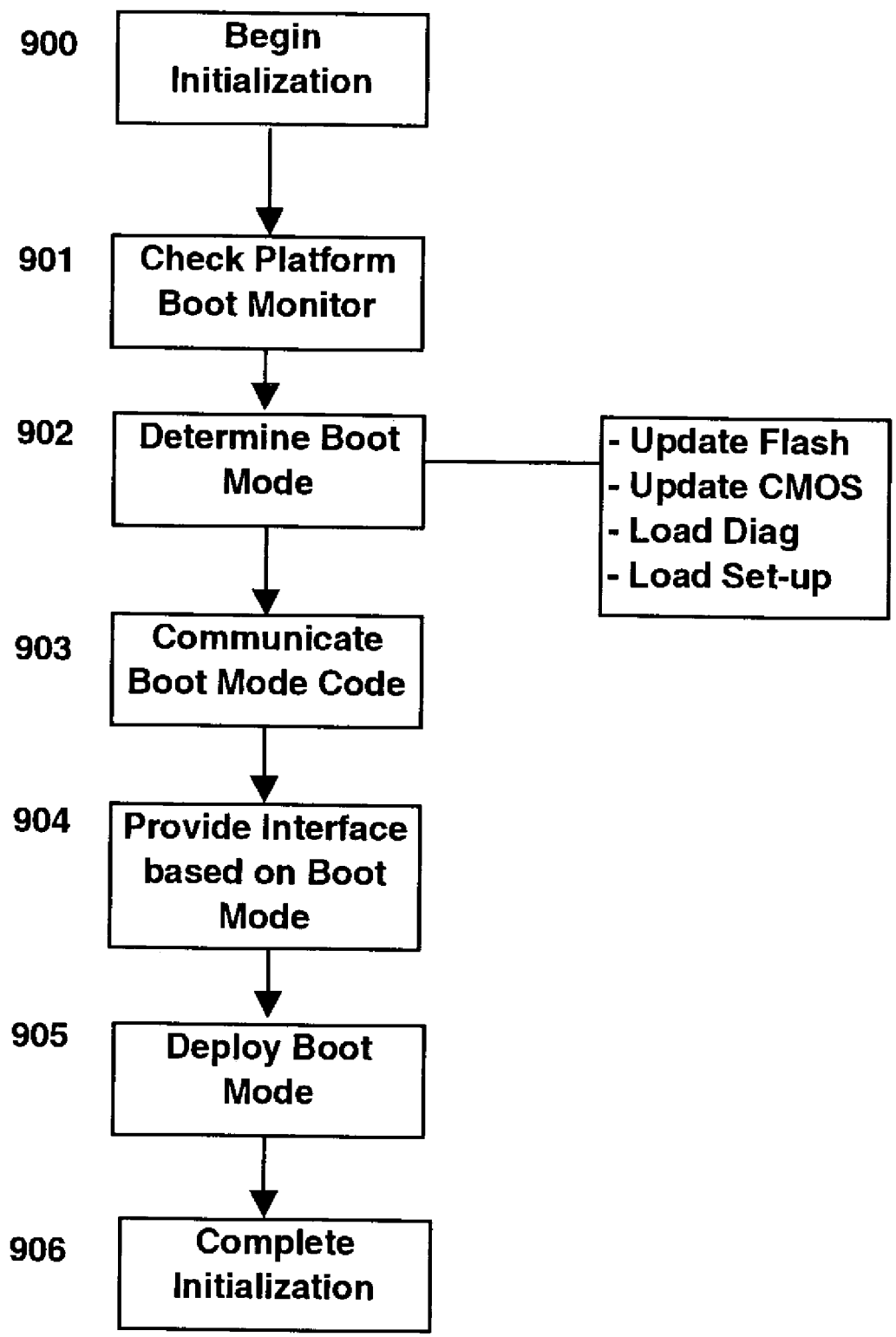
FIG. 9 is a flow diagram illustrating a method for initializing a server platform coupled to a service processor employing a Platform Boot Monitor (PBM) according to at least one embodiment of the present invention.

FIG. 9 is a flow diagram illustrating a method for initializing a server platform coupled to a service processor employing a Platform Boot Monitor (PBM). The method begins at step 900 as a system is powered up, initialized, reset, soft-booted, etc. The method checks the PBM at step 901 and determines a boot mode at step 902. For example, the PBM may initiate a flash update, a CMOS update, or initialize the system in a diagnostic mode, or a set-up mode. Upon determining a boot mode, the PBM communicates a boot mode code 903 to a platform BIOS via a platform BIOS protocol interface.

The platform BIOS determines the boot mode and provides an interface 904 based on the desired boot mode. For example, if an update flash boot mode is selected a flash update interface is engaged and a flash update boot mode is employed 905. The interface may include one or more connections between the platform server platform employing the BIOS and a service processor employing a PBM. For example, a UDP/IP protocol interface and may be used to receive a flash image and communicate status information to the PBM relating to the update. Upon deploying the selected boot mode, the method proceeds to complete the initialization sequence. For example, if the flash BIOS has been updated the server platform may be reset or reboot to use the new flash update that has been provided.

FIG. 10 is a flow diagram illustrating a method for initializing a server platform using a multi-mode initialization sequence. The method begins generally at step 1000 when a boot sequence for initializing a server platform is initiated. A boot synch code is sent 1001 by a platform BIOS of the server platform to a platform boot manager (PBM) of a service processor indicating that an initialization process has begun. A boot synch acknowledge 1006 is provided from the PBM 1006 to the platform BIOS and a boot mode provided by the PBM is determined. For example, the PBM may provide a boot code to the platform BIOS indicating a flash update mode, a CMOS update mode, a diagnostic mode, or a set-up mode. In some situations, the service processor and/or PBM may not be available to provide a boot mode for the server platform and/or an alternate boot mode may not be desired. As such, a default mode of operation may be employed allowing a system to use the LGC and initialize the server platform accordingly. The platform BIOS continues to initialize each component associated with the server platform to verify that a minimum amount of hardware is functional for initializing the system based on a desired boot mode. For example, in a headless server platform memory and processor tests (i.e. POSTs) 1002 may be performed for initializing the server system.

Upon performing POST routines, the method determines the last good configuration (LGC) 1003 used in the previous valid boot or initialization. For example, the last good configuration may be available and stored as a table provided by the primary boot monitor. If the PBM is up and accessible, the LGC is obtained 1004 for use during initialization. However, if the LGC is not available and/or the service processor is not accessible, the platform BIOS may access a saved copy of the LGC 1005 stored local or accessibly located with the server platform.

If a flash update mode is provided, the method proceeds to step 1008 where the flash update mode includes receiving a flash image 1009 from the PBM to update the Flash BIOS of the server platform. If the image is valid, the method proceeds to step 1014 where the flash is updated and a status or progress signal is provided during the update to alert the PBM that the platform BIOS is still active. The method then proceeds to step 1015 where the system or server is reinitialized using the new flash image. In this manner, a flash BIOS may be modified via a second process, such as a primary boot monitor employed by a service processor, without having to access hardware associated with the server platform thereby providing for efficient updating of the flash BIOS. If an error occurred during the transfer of the image or during the update of the new flash image, and error code is reported at step 1012 and the method proceeds to initialize the system using the previous flash BIOS 1013.

If a CMOS update mode of operation is provided, the method proceeds to step 1016 and a CMOS for each device is accessed to determine settings stored within CMOS. For example, settings may include enable/disable or other operational setting for installed hardware or BIOS features. Each value is read during the process 1017 and written or saved 1018 accordingly. The server platform is then reset and the new CMOS values are used to initialize the system 1019.

If a diagnostic mode of operation is provided the method employs a diagnostic mode of operation 1020 and receives a diagnostic image communicated by the PBM to the platform BIOS 1021. The image is validated at step 1022 and used to initialize the system in a diagnostic mode 1023 to provide access to diagnostics and components for the server platform. If an error occurred during transferring the image to the platform BIOS, an error code is reported at step 1025.

A set-up mode of operation may be deployed at step 1026 allowing a set-up menu to be displayed at step 1027. For example, a set-up mode may include allowing a user access to initialization and set-up information for the specified server via a graphical user interface. For example, a user may be remotely located and as such may access initialization information for a specific server platform to access and modify settings, values, variables, etc. associated with initializing the server. The GUI may be displayed via a network browser or other user interface and may be provided as a client-server based application. In one embodiment, a full size monitor may be provided in association with the server to allow access to a set-up information. However, in other embodiments, the set-up menu may be provided within a mini-display associated with a headless server system. For example, a server platform may not have access to conventional monitors or displays and as such may include a small display operable to display limited amounts of information. As such, a set-up menu may be reduced to a few graphical lines of text allowing a user to navigate the set-up menu using a pointing device such as a mouse, trackball, and/or function buttons associated with the small display.

If an alternate initialization or boot mode is not provided by the PBM or if the service processor and/or PBM is not available, a default initialization mode may be employed by the server platform and platform BIOS to initialize the server platform at step 1028. The server may be initialized using the LGC obtained from the PBM or may use the LGC stored local to the server platform allowing for access to a saved copy of the last good configuration. The platform BIOS proceeds to initialize the system at step 1029 using the LGC in a default mode.

The methods and systems herein provides for a flexible implementation. Although the invention has been described using certain specific examples, it will be apparent to those skilled in the art that the invention is not limited to these few examples. For example, the disclosure is discussed herein primarily with regard to the application of Linux to diagnostic architecture utilizing SMP and/or ccNUMA technology, however, the invention can be used in other environments, systems or processes that require full diagnostic support, such as enterprise-class servers or clustered computing systems. Additionally, various operating systems and hardware devices are currently available which could be suitable for use in employing the method as taught herein, e.g., Windows .Net server, Windows 64-bit (when available), as well as Linux 32- and 64-bit, and the like. Generally, the various functions and systems represented by block diagrams are readily implemented by one of ordinary skill in the art using one or more of the implementation techniques listed herein. Note also, that although an embodiment of the present invention has been shown and described in detail herein, along with certain variants thereof, many other varied embodiments that incorporate the teachings of the invention may be easily constructed by those skilled in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method of initializing an information system comprising the steps of:
    establishing a communication between a platform BIOS and a platform boot monitor during an initialization sequence;
    determining a boot mode for the platform BIOS;
    communicating a boot initialization code between the platform BIOS and the platform boot monitor; and
    identifying the boot mode using the boot initialization code.

2. The method of claim 1 further comprising the steps of:
    receiving a flash BIOS update image communicated by a memory coupled to the server platform upon determining a flash update boot mode;
    storing the flash BIOS update image within a memory associated with the BIOS;
    verifying the flash BIOS update image prior to updating the flash memory; and communicating an acknowledgement message in response to the update.

3. The method of claim 2 further comprising the steps of: communicating a progress message between the platform BIOS and the boot monitor during the flash update; and
initiating a reboot using the service processor upon successfully updating the flash update.

4. The method of claim 1 further comprising the steps of: communicating a boot synch message between the platform BIOS and the platform boot monitor; and
initiating a boot mode based on the boot mode message.

5. The method of claim 1 further comprising initiating a recent valid configuration dialog between the platform BIOS and the platform boot monitor.

6. The method of claim 1 further comprising communicating a post code message between the platform BIOS and the platform boot monitor upon detecting a POST error of the server platform.

7. The method of claim 1 further comprising communicating a mode ready message between the platform BIOS and the platform boot monitor to indicate that the platform BIOS is successfully initializing.

8. The method of claim 1 further comprising communicating an error message between the platform BIOS and the platform boot monitor to indicate that the error occurred during initialization.

9. A method for initializing an information system comprising the steps of:
communicating a boot initialization request to a service processor during a low resource initialization period;
receiving a boot acknowledgement message including a boot code for initializing a server platform;
determining a boot mode using the boot code;
enabling a communication interface associated with the boot mode; and
communicating a ready signal to the service processor in response to an availability of the server platform.

10. The method of claim 9 wherein the
determining the boot mode includes determining at least one of:
a flash update mode;
a CMOS update mode;
a diagnostic mode;
a set-up mode; and
a default mode.

11. The method of claim 10 further comprising the steps of:
receiving a BIOS image communicated by the service processor in response to determining a flash update mode;
storing the BIOS image within a memory coupled to the server platform;
verifying the BIOS image prior to updating a BIOS flash memory of the server platform; and
communicating a progress message to a platform boot monitor during the flash update mode.

12. A computer readable medium tangibly embodying one or more instructions, said one or more instructions including instructions to:
establish a communication between a platform BIOS and a platform boot monitor during an initialization sequence;
determine a boot mode for the platform BIOS;
communicate a boot initialization code between the platform BIOS and the platform boot monitor; and
identify the boot mode using the boot initialization code.

13. The computer readable medium as in claim 12 further including instructions to:
receive a flash BIOS update image communicated by a flash memory coupled to the server platform upon determining a flash update boot mode;
store the flash BIOS update image within a memory associated with the BIOS;
verify the flash BIOS update image prior to updating the flash memory; and
communicate an acknowledgement message in response to the update.

14. The computer readable medium as in claim 13 further including instructions to:
communicate a progress message between the platform BIOS and the boot monitor during the flash update; and
initiate a reboot using the service processor upon successfully updating the flash update.

15. The computer readable medium as in claim 12 further including instructions to:
communicate a boot synch message between the platform BIOS and the platform boot monitor; and
initiate a boot mode based on the boot mode message.

16. The computer readable medium as in claim 12 further including instructions to initiate a resent valid configuration dialog between the platform BIOS and the platform boot monitor.

17. A computer readable medium tangibly embodying one or more instructions; said one or more instructions including instructions to:
communicate a boot initialization request to a service processor during a low resource initialization period;
receive a boot acknowledgement message including a boot code for initializing a server platform;
determine a boot mode using the boot code;
enable a communication interface associated with the boot mode; and
communicate a ready signal to the service processor in response to an availability of the server platform.

18. The computer readable medium as in claim 17 further including instructions to
determine at least one of:
a flash update mode;
a CMOS update mode;
a diagnostic mode;
a set-up mode; and
a default mode.

* * * * *